United States Patent [19]
Yamato et al.

[11] 3,714,171
[45] Jan. 30, 1973

[54] 1-(2-CYCLOHEXYLETHYL)-6 OR 7 METHOXY-1,2,3,4-TETRAHYDROISOQUINOLINE AND ACID ADDITION SALTS THEREOF

[75] Inventors: Eisaku Yamato, Yono; Yuji Miura, Kawaguchi; Masao Wada, Warabi; Toshio Sekiguchi, Kawasaki; Masazumi Kawanishi, Tokyo; Masanori Sato, Toda; Masao Hoshiyama, Tokyo; Taku Nagao, Warabi, all of Japan

[73] Assignee: Tanabe Seiyaku, Co., Ltd., Higashi-ku, Osaka, Japan

[22] Filed: Dec. 13, 1971

[21] Appl. No.: 207,598

Related U.S. Application Data

[62] Division of Ser. No. 3,506, Jan. 16, 1970, abandoned.

[30] Foreign Application Priority Data

Jan. 25, 1969 Japan .................................. 44/5490
Jan. 25, 1969 Japan .................................. 44/5491

[52] U.S. Cl. ...... 260/286 R, 260/283 SY, 260/289 R, 260/557 R, 424/258
[51] Int. Cl. ............................................. C07o 35/10
[58] Field of Search .............. 260/289, 289 A, 286 R

[56] References Cited

UNITED STATES PATENTS

3,644,366  2/1972  Seanmart ..................... 260/286 R
2,633,709  12/1953  Craig ........................... 260/286 R
2,683,146  7/1954  Robinson ..................... 260/286 R

OTHER PUBLICATIONS

Battersby et al., Chem. Abstr. Vol. 56, col. 4721–4722.

*Primary Examiner*—Donald G. Daus
*Attorney*—Harry C. Bierman et al.

[57] ABSTRACT

A 6- or a 7-methoxyisoquinoline compound having the formula

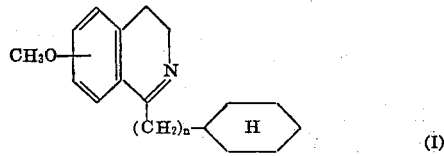
(I)

or

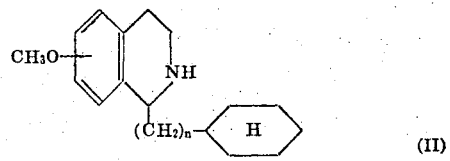
(II)

wherein $n$ is 1-3 and its pharmaceutically acceptable acid addition salts are cutaneous vasodilators.
Compound (I) is produced by dehydrating an amide compound having the formula

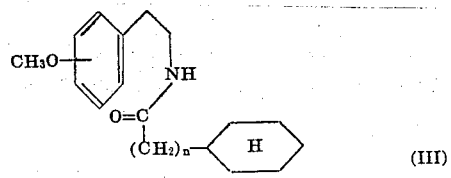
(III)

wherein $n$ is as defined above.

Compound (II) is produced by hydrogenating compound (I).

3 Claims, No Drawings

1-(2-CYCLOHEXYLETHYL)-6 OR 7 METHOXY-1,2,3,4-TETRAHYDROISOQUINOLINE AND ACID ADDITION SALTS THEREOF

This is a division of application Ser. No. 3,506, filed Jan. 16, 1970 and now abandoned.

This invention relates to novel derivatives of 6- or 7-methoxyisoquinoline and to a process for preparing same.

The derivatives of the present invention are represented by the following formulae:

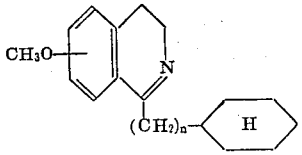

(I)

or

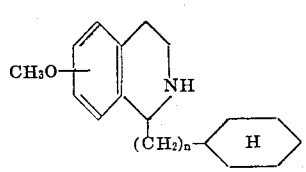

(II)

wherein n is an integer from 1 to 3. Pharmaceutically acceptable acid addition salts of these derivatives are also included within the scope of the instant invention.

We have found that the above mentioned new derivatives of 6- or 7-methoxyisoquinoline and their acid addition salts are useful as cutaneous vasodilators. The cutaneous vasodilating action of compounds (I) or (II) of this invention is estimated to be about 2 to 5 times stronger than that of papaverine. The compounds of the present invention are characterized by their selective action on cutaneous blood vessels. Moreover, the compounds of the present invention do not show this dilating action on any other peripheral blood vessels. For example, the following compounds increased the flow rate of blood in the auricular blood vessel of the rabbit (body weight 4.0–4.5 kg.) about 4 to 5 times greater than did papaverine when said compounds were administered into said vessel respectively at a dose of 5 µg./ear; 1-(3-cyclo-hexylpropyl)-6-methoxy-3,4-dihydroisoquinoline(hydrochloride): 1-cyclohexyl-methyl-6-methoxy-1,2,3,4-tetrahydroisoquinoline (hydrochloride): 1-(2-cyclohexylethyl)-7methoxy-1,2,3,4-tetrahydroisoquinoline(hydrochloride): 1-(3-cyclohexylpropyl)-6-methoxy-1,2,3,4-tetrahydroisoquinoline(hydrochloride). It should be noted that these compounds showed no such dilating effect on the common carotid artery of dogs.

The toxicity of the isoquinoline compounds (I) and (II) is relatively low. For example, the acute toxicity ($LD_{50}$) of 1-(3-cyclohexylpropyl)-6-methoxy-3,4dihydroisoquinoline hydrochloride when administered to mice intravenously is about 55 mg./kg.

According to this invention, the isoquinoline compounds (I) and (II) can be prepared by dehydrating an amide compound represented by the formulae:

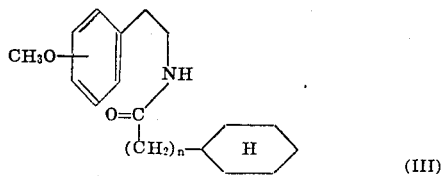

(III)

wherein n is as defined above to produce a 1-substituted 6- or 7-methoxy-3,4-dihydroisoquinoline compound which can be further hydrogenated to produce the compound (II).

The above stated processes may be represented by the following reaction scheme:

(A)
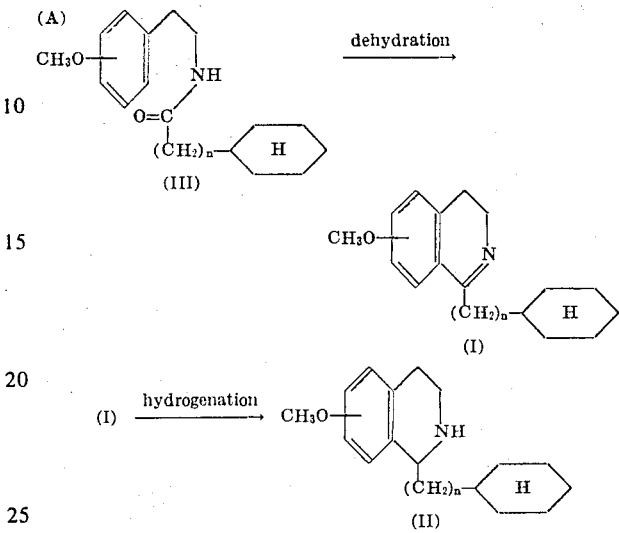

wherein n is as defined above.

The starting compound (III) is readily obtainable. For example, it may be produced by heating 3- or 4-methoxy phenethylamine for a few hours in an oil bath, with an acid represented by the formula:

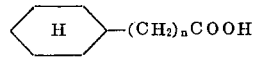

wherein n is as defined above.

The dehydration reaction of the present invention can be carried out by heating the compound (III) in the presence of dehydrating agent (e.g. phosphorus oxychloride, phosphorus pentachloride, polyphosphoric acid or esters of polyphosphoric acid). Suitable reaction solvents include, for example, benzene, toluene, xylene, chloroform, carbon tetrachloride, etc. It is, however, not essential to use said solvents in carrying out the reaction. When phosphorus oxychloride is employed as the dehydrating agent, it may also serve as the reaction solvent.

1-substituted-6- or 7-methoxy-1,2,3,4-tetrahydroisquinoline (II) can be prepared by hydrogenating the corresponding 3,4-dihydroisoquinoline (I). The hydrogenation reaction may be effected by an appropriate procedure. For example, a chemical hydrogenation using an agent such as sodium borohydride, zinc-acetic acid, zinc-hydrochloric acid or ironhydrochloric acid may be employed. Alternatively, a catalytic hydrogenation using a catalyst such as Raney-nickel, paladium-carbon or Adams' platinum may be used. Methanol, ethanol, tetrahydrofuran, aqueous methanol, etc., are suitable reaction solvents.

The isoquinoline compounds (I) and/or (II) can be employed for pharmaceutical use either as the free base or a salt thereof. The base and salt thereof are readily convertible from one to the other by conventional manner. Examples of preferred therapeutically acceptable salts are salts formed with mineral acids, such as hydrochloric acid, hydrobromic acid, perchloric acid, nitric acid, sulfuric acid or phosphoric acid, or with organic acids such as formic acid, acetic acid, propionic acid, glycollic acid, lactic acid, pyruvic acid, oxalic acid, malonic acid, succinic acid, maleic acid, fumaric acid, malic acid, citric acid, tartaric acid, ascorbic acid, hydroxymaleic acid, benzoic acid, phenylacetic acid, aminobenzoic acid, methanesulfonic acid, ethanesulfonic acid, benzenesulfonic acid, p-toluenesulfonic acid, sulfanilic acid, aspartic acid or glutamic acid. The isoquinoline compounds (I) and/or (II) may be used in pharmaceutical preparations in conjunction or admixture with a pharmaceutical excipient that is suitable for enteral or parenteral administration. The excipient selected should be one that does not react with the isoquinoline compounds (I) and/or (II). Suitable excipients include, for example, gelatin, lactose, glucose, sodium chloride, starch, magnesium stearate, talcum, vegetable oil, benzyl alcohol and gums. Other known medicinal excipients may be employed. The pharmaceutical preparation may be a solid dosage form such as a tablet, a coated tablet, a pill or a capsule, or a liquid dosage form such as a solution, a suspension, or an emulsion. The pharmaceutical preparation may be sterilized and/or may contain auxiliaries, such as preserving, stabilizing, wetting or emulsifying agents. The pharmaceutical preparation may also contain other therapeutically valuable substances.

Practical and presently preferred embodiments of the present invention are illustratively shown in the following Examples.

EXAMPLE 1

1. A mixture of 4.1 g. of 3-methoxyphenethylamine and 4.0 g. of cyclohexylacetic acid is heated for 3.5 hours in an oil bath at a temperature of 180°–190°C., and the resulting water is removed by distillation. The mixture is allowed to cool and is then dissolved in benzene. The resultant benzene solution is then successively washed with 10 percent hydrochloric acid, water, 10 percent sodium hydroxide and water. The solution is then dried and evaporated to remove the solvent. The residue thus obtained is recrystallized from a mixture of benzene and n-hexane. 6.28 g. of N-(3-methoxyphenethyl)-2-cyclohexyl acetamide are obtained. M.p. 74.5°–75.5°C. Colorless needles. Yield: 84.1 percent Analysis calculated for $C_{17}H_{25}O_2N$
C,74.14: H,9.15: N,5.09
Found: C,74.43: H,9.38: N,5.11

2. A mixture of 6.0 g. of N-(3-methoxyphenethyl)-2cyclohexylacetamide, 30 ml. of absolute benzene and 7 ml. of phosphorus oxychloride is refluxed for 2 hours. The reaction mixture is then evaporated under reduced pressure to remove the solvent. The residue thus obtained is mixed with ice-water to decompose the remaining phosphorus oxychloride, and the resultant mixture is washed with benzene. The aqueous layer is alkalinized with sodium bicarbonate and the resulting oil is extracted with benzene. The benzene layer is washed with water, dried and evaporated to remove the solvent. The residue is then distilled under reduced pressure. 5.04 g. of 1-cyclohexylamethyl-6-methoxy-3,4-dihydroisoquinoline boiling at 170°–176°C/2 mmHg. are obtained. Colorless viscous oil. Yield: 90 percent Hydrochloride (recrystallized from methanol-ether) M.p. 195°–196.5°C. (decomp.) Colorless prisms.

Analysis calculated for $C_{17}H_{23}ON \cdot HCl$
C,69.50: H,8.24: N,4.76: Cl,12.06
Found: C,69.52: H,8.25: N,4.72: Cl,12.01

EXAMPLE 2

16.8 g. of N-(3-methoxyphenethyl)-3-cyclohexylpropionamide are obtained in the same manner as is described in Example 1-(1) excepting that 10.3 g. of cyclohexylpropionic acid are used instead of cyclohexylacetic acid. M.p. 60°–61.5°C. Colorless needles (recrystallized from benzene). Yield: 87.7 percent Analysis calculated for $C_{18}H_{27}O_2N$
C,74.70: H,9.40: N,4.84
Found: C,74.91: H,9.54: N,4.82

16 g. of 1-(2-cyclohexylethyl)-4-methoxy-3,4-dihydroisoquinoline hydrochloride are obtained in the same manner as is described in Example 1(2) excepting that 16.5 g. of N-(3-methoxyphenethyl)-3-cyclohexylpropionamide are used instead of N-(3-methoxyphenethyl)-2-cyclohexylacetamide. M.p. 173°–174°C. (decomp.) Colorless needles (recrystallized from isopropanol-ether) Yield: 91.5 percent Analysis calculated for $C_{18}H_{25}ON \cdot HCl$
C,70.19: H,8.51: N,4.55: Cl,11.51
Found: C,70.07: H,8.60: N,4.54: Cl,11.34

EXAMPLE 3

17.3 g. of N-(3-methoxyphenethyl)-4-cyclohexylbutyrylamide are obtained in the same manner as is described in Example 1-(1) excepting that 10 g. of cyclohexylbutyric acid are used instead of cyclohexylacetic acid. B.p. 200°–203°C/0.6 mmHg. Colorless oil. Yield: 96.6 percent Analysis calculated for $C_{19}H_{29}O_2N$
C,75.20: H,9.63: N,4.62
Found: C,75.34: H,9.78: N,4.64

14.3 g. of 1-(3-cyclohexylpropyl)-4-methoxy-3,4-dihydroisoquinoline hydrochloride are obtained in the same manner as is described in Example 1-(2) excepting that 16.9 g. of N-(3-methoxyphenethyl)-4-cyclohexylbutyrylamide are used instead of N-(3-methoxyphenethyl)-2-cyclohexylacetamide. M.p. 58°C. Colorless needles (recrystallized from acetone-water-ether). Yield: 79.9 percent Analysis calculated for $C_{19}H_{27}ON \cdot HCl$
C,68.97: H,8.84: N,4.23: Cl,10.72
Found: C,68.90: H,8.86: N,4.23: Cl,10.70

EXAMPLE 4

5.07 g. of 1-cyclohexylmethyl-6-methoxy-3,4-dihydroisoquinoline hydrochloride are dissolved in 40 ml. of methanol. 0.7 g. of sodium borohydride is gradually added to the solution over a period of about 20 minutes while cooling at a temperature of about 10°C. After a standing period of 30 minutes at room temperature, the solution is refluxed for 30 minutes. The reaction solution is then evaporated to remove solvent. The residue thus obtained is mixed with 10 percent sodium hydroxide and diluted with water. The resultant solution is extracted with benzene. The benzene layer is washed with water, dried and evaporated to remove the solvent and the residue is distilled under reduced pressure. 4.34 g. of 1-cyclohexyl-methyl-6-methoxy-1,2,3,4-tetrahydroisoquinoline boiling at 175°–180°C/2 mmHg. are obtained. Colorless viscous oil. Yield: 96.8 percent. The hydrochloride salt of this compound is recrystallized from a mixture of methanol and ether to give colorless needles melting at 206°–208°C.

Analysis calculated for $C_{17}H_{25}ON$ HCl
C,69.01: H,8.86: N,4.73: Cl,11.99
Found: C,69.06: H,9.00: N,4.77: Cl,11.99

EXAMPLE 5

6.81 g. of 1-(2-cyclohexylethyl)-6-methoxy-1,2,3,4-tetrahydroisoquinoline hydrochloride are obtained in the same manner as is described in Example 4 excepting that 8 g. of 1-(2-cyclohexylethyl)-6-methoxy-3,4-dihydroiso-quinoline hydrochloride are used instead of 1-cyclohexylmethyl-6-methoxy-3,4-dihydroisoquinoline hydrochloride. M.p. 227°–229°C. Colorless needles (recrystallized from methanol-ether). Yield: 84.5 percent.

Analysis calculated for $C_{18}H_{27}ON$ HCl
C,69,76: H,9.10: N,4.52: Cl,11.44
Found C,69.82: H,9.34: N,4.55: Cl,11.61

EXAMPLE 6

7.4 g. of 1-(3-cyclohexylpropyl)-6-methoxy-1,2,3,4-tetrahydroisoquinoline hydrochloride are obtained in the same manner as is described in Example 4 excepting that 8.2 g. of 1-(3-cyclohexylpropyl)-6-methoxy-3,4-dihydroisoquinoline hydrochloride are used instead of 1-cyclohexylmethyl-6-methoxy-3,4-dihydroisoquiniline hydrochloride. M.p. 167°–169°C. Colorless needles (recrystallized from methanol-ether). Yield: 90.4 percent Analysis calculated for $C_{19}H_{29}ON$ HCl
C,70.46: H,9.33: N,4.32: Cl,10.94
Found: C,70.51: H,9.36: N,4.31: Cl,10.90

EXAMPLE 7

1. A mixture of 7.5 g. of 4-methoxy-phenethylamine and 7.0 g. of cyclohexylacetic acid is heated for 2.5 hours in an oil bath at a temperature of 180°–190°C, and the resulting water is removed by distillation. The mixture is allowed to cool and is then dissolved in chloroform. The chloroform solution is successively washed with 10 percent hydrochloric acid, water, 10 percent sodium hydroxide and water. The solution is dried and evaporated to remove the solvent. The residue thus obtained is recrystallized from a mixture of benzene and n-hexane. 11.9 g. of N-(4-methoxyphenethyl)-2-cyclohexyl-acetamide are obtained. M.p. 109°–110°C. Colorless needles. Yield: 87.1 percent Analysis calculated for $C_{17}H_{25}O_2N$
C,74.14: H,9.15: N,5.09
Found: C,74.59: H,9.29: N,5.12

2. A mixture of 11 g. of N-(4-methoxyphenethyl)-2-cyclohexylacetamide, 33 g. of phosphorus pentoxide, 15 g. of sellaite and 200 ml. of absolute benzene is stirred vigorously and refluxed for 8 hours. The reaction mixture is allowed to cool. It is then poured into ice-water to decompose the remaining phosphorus pentoxide. 20 ml. of 35 percent hydrochloric acid are added to the solution. The solution is then heated to 80°C. After cooling, the insoluble materials are removed by filtration, and the aqueous layer is separated from the filtrate and washed with benzene, alkalinized with 20 percent sodium hydroxide and extracted with ether. The ether layer is washed with an aqueous solution saturated with sodium chloride. The solution is then dried and evaporated to remove the solvent and the resultant residue is distilled under reduced pressure. 3.6 g. of 1-cyclohexylmethyl-7-methoxy-3,4-dihydroisoquinoline boiling at 162°–164°C/2 mmHg. are obtained. Slightly yellow oil. Yield: 35 percent Hydrochloride (recrystallized from ethanol ether) M.p. 192°–193°C. (decomp.) Colorless needles.

Analysis calculated for $C_{17}H_{23}ON$ HCl
C,69.50: H8.24: N,4.76: Cl,12.06
Found: C,69.24: H,8.31: N,4.86: Cl,12.52

EXAMPLE 8

24.87 g. of N-(4-methoxyphenethyl)-3-cyclohexylpropionamide are obtained in the same manner as is described in Example 7-(1) excepting that 15.6 g. of cyclohexylpropionic acid are used instead of cyclohexylacetic acid. M.p. 111°C. Colorless needles (recrystallized from benzene-n-hexane). Yield: 86.0 percent Analysis calculated for $C_{18}H_{27}O_2N$
C,74.70: H,9.40: N,4.84
Found: C,75.05: H,9.53: N,4.77

2.45 g. of 1-(2-cyclohexylethyl)-7-methoxy-3,4-dihydroisoquinoline hydrochloride are obtained in the same manner as is described in Example 7-(2) excepting that 13 g. of N-(4-methoxyphenethyl)-3-cyclohexylpropionamide are used instead of N-(4-methoxyphenethyl)-2-cyclohexylacetamide. M.p. 168°–170°C. (decomp.) Colorless prisms (recrystallized from ethanol-ether). Yield. 17.6 percent Analysis calculated for $C_{18}H_{25}ON$ HCl
C,70.23: H,8.51: N,4.55: Cl,11.52
Found: C,70.16: H,8.57: N,4.53: Cl,11.42

EXAMPLE 9

17.2 g. of N-(4-methoxyphenethyl)-4-cyclohexylbutyrylamide are obtained in the same manner as is described in Example 7-(1) excepting that 10 g. of cyclohexylbutyric acid are used instead of cyclohexylacetic acid. M.p. 77°–78°C. Colorless needles (recrystallized from benzene-n-hexane). Yield 96.3 percent Analysis calculated for $C_{19}H_{29}O_2N$
C,75.20: H,9.63: N,4.62
Found: C,74.80: H,9.71: N,4.62

1.47 g. of 1.-(3-cyclohexylpropyl)-7-methoxy-3,4-dihydroisoquinoline pic rate are obtained in the same manner as is described in Example 7-(2) excepting that 6 g. of N-(4-methoxyphenethyl)-4-cyclohexylbutyrylamide are used instead of N-(4-methoxyphenethyl)-2-cyclohexylacetamide. M.p. 149°–151°C. Yellow prisms (recrystallized from ethanol). Yield: 14.2 percent Analysis calculated for $C_{19}H_{27}ON$ $C_6H_3O_7N_3$
C,58.36: H,5.88: N,10.89
Found: C,58.84: H,5.88: N,10.87

EXAMPLE 10

4.0 g. of 1cyclohexylmethyl-7-methoxy-3,4-dihydroisoquinoline hydrochloride are dissolved in 50 ml. of methanol. 0.6 g. of sodium borohydride is gradually added to the solution over a period of about 20 minutes while cooling at a temperature of about 10°C. The solution is allowed to stand at room temperature for 30 minutes. It is then refluxed for 30 minutes. The reaction solution is evaporated to remove the solvent. The residue thus obtained is mixed with 10 percent sodium hydroxide and diluted with water. The solution is extracted with benzene. The benzene layer is washed with water, dried and evaporated to remove the solvent. 3.3 g. of 1-cyclo-hexylmethyl-7-methoxy-1,2,3,4-tetrahydroisoquiniline are obtained. Pale yellow oil. The hydrochloride salt of this compound is recrystallized from a mixture of ethanol and isopropyl ether. 3.0 g. of colorless needles melting at 188°–191 °C. are obtained. Yield: 74.5 percent Analysis calculated for $C_{17}H_{25}ON$ HCl
C,69.01: H,8.86: N,4.73: Cl,11.99
Found: C,69.23: H,9.01: N,4.64: Cl,11.92

EXAMPLE 11

0.61 g. of 1-(2-cyclohexylethyl)-7-methoxy-1,2,3,4-tetrahydroisoquinoline hydrochloride is obtained in the same manner as is described in Example 10 excepting that 1.15 g. of 1-(2-cyclohexylethyl)-7-methoxy-3,4-dihydroisoquinoline hydrochloride are used instead of 1cyclohexylmethyl-7-methoxy-3,4-dihydroisoquinoline hydrochloride.

M.p. 227°–229°C. Colorless needles (recrystallized from ethanol-ether). Yield: 52.5 percent
methoxy-3,4-dihydroisoquinoline hydrochloride are Analysis calculated for $C_{18}H_{27}ON$ HCl
C,69.76: H,9.10: N,4.52: Cl,11.44
Found: C,69.39: H,9.14: N,4.53: Cl,11.65

EXAMPLE 12

3.85 g. of 1-(3-cyclohexylpropyl)-7-methoxy-1,2,3,4-tetrahydroisoquinoline hydrochloride are obtained in the same manner as is described in Example 10 excepting that 7.8 g. of 1-(3-cyclohexylpropyl)-7- used instead of 1-cyclohexylmethyl-7-methoxy-3,4-dihydroisoquinoline hydrochloride.

M.p. 163°–164°C. Colorless needles (recrystallized from ethanol-ether). Yield 49.1 percent Analysis calculated for $C_{19}H_{29}ON$ HCl
C,70.46: H,9.33: N,4.32: Cl,10.94
Found: C,70.64: H,9.40: N,4.27: Cl,10.89

What is claimed is:

1. 1-(2-Cyclohexylethyl)-6- or 7-methoxy-1, 2, 3, 4-tetrahydroisoquinoline or a pharmaceutically acceptable acid addition salt thereof.

2. The compound as claimed in claim 1, wherein said salt is a pharmaceutically acceptable hydrohalide of 1-(2-cyclohexylethyl)-6-methoxy-1, 2, 3, 4-tetrahydroisoquinoline.

3. The compound as claimed in claim 1, wherein said salt is a pharmaceutically acceptable hydrohalide of 1-(2-cyclohexylethyl)-7-methoxy-1, 2, 3, 4-tetrahydroisoquinoline.

* * * * *